United States Patent

Kawada et al.

[11] Patent Number: 6,100,957
[45] Date of Patent: Aug. 8, 2000

[54] ELECTRODE STRUCTURE OF LIQUID CRYSTAL DEVICE HAVING TWO OUTPUT TERMINALS ELECTRICALLY CONNECTED TO AN ELECTRODE

[75] Inventors: Sachiko Kawada; Mie Ohara, both of Tokorozawa, Japan

[73] Assignee: Citizen Watch Co., Ltd., Tokyo, Japan

[21] Appl. No.: 09/125,349

[22] PCT Filed: Feb. 14, 1997

[86] PCT No.: PCT/JP97/00403

§ 371 Date: Aug. 18, 1998

§ 102(e) Date: Aug. 18, 1998

[87] PCT Pub. No.: WO97/32235

PCT Pub. Date: Sep. 4, 1997

[30] Foreign Application Priority Data

Feb. 29, 1996 [JP] Japan .................................. 8-042494

[51] Int. Cl.[7] .................................................. G02F 1/1345
[52] U.S. Cl. .............................................. 349/149; 349/152
[58] Field of Search ..................................... 349/152, 151, 349/149

[56] References Cited

U.S. PATENT DOCUMENTS 4,906,071  3/1990  Takahara et al. ..................... 350/331
5,729,315  3/1998  Takahashi et al. .................... 349/149

*Primary Examiner*—Walter Malinowski
*Attorney, Agent, or Firm*—Finnegan, Henderson, Farabow, Garrett & Dunner, L.L.P.

[57] ABSTRACT

The present invention attempts to overcome irregular display deriving from a variation in resistance among wiring electrodes or periodicity of resistances. At least two output terminals of a driving IC chip and one electrode are linked, whereby the width of a wiring electrode can be made twice larger or more. Consequently, the variation in resistance among wiring electrodes is minimized. Furthermore, if driving IC chips are placed at both ends of belt-shaped electrodes, a difference in voltage between the right and left sides of a display screen will not occur. A difference in display state between the right and left sides of the display screen can be resolved (FIG. 3).

7 Claims, 4 Drawing Sheets

ELECTRODE STRUCTURE OF LIQUID CRYSTAL DEVICE HAVING TWO OUTPUT TERMINALS ELECTRICALLY CONNECTED TO AN ELECTRODE

TECHNICAL FIELD

The present invention relates to a structure of electrodes for a liquid crystal device or, more particularly, to a structure of electrodes to be connected to a driving IC chip in a liquid crystal device that requires a high driving voltage such as a device using a ferroelectric liquid crystal or an antiferroelectric liquid crystal.

BACKGROUND ART

A liquid crystal device is generally designed to have a liquid crystal sandwiched between a pair of substrates having a plurality of electrodes formed on surfaces thereof which are mutually opposed. A potential difference is produced between electrodes that are opposed and orthogonal to each other. Thus, the liquid crystal molecules are displaced. The liquid crystal device utilizing displacement of liquid crystal molecules has been widely adopted as an electro-optic device.

To be more specific, the liquid crystal device is placed between a pair of sheet polarizers arranged so that the axes of polarization thereof will be orthogonal to each other. At this time, an axis of absorption of one of the polarizers coincides with the direction of liquid crystal molecules. The liquid crystal molecules are displaced according to whether no voltage is applied to the liquid crystal device (light is transmitted) or a voltage is applied thereto (light is intercepted). A change in amount of light transmitted by the liquid crystal device is then detected.

Normally, belt-shaped electrodes arranged in a longitudinal direction are referred to as signal electrodes, and belt-shaped electrodes arranged in a lateral direction are referred to as scan electrodes. As mentioned above, a voltage signal is applied to the liquid crystal device while application of the signal is synchronized between each signal electrode and scan electrode. A potential difference between the signal electrode and scan electrode is utilized for driving liquid crystal molecules.

In this case, characteristic signals are produced by a driving IC chip or the like, and supplied to the signal electrodes and scan electrodes respectively. For supplying the signals to the electrodes, two methods, described below, have generally been adopted.

Specifically, one of the methods is the flip-chip bonding (chip-on-glass (COG) bonding for glass substrates) where output terminals of a driving IC chip and wiring electrodes led out from electrodes are electrically coupled with each other using a conductive adhesive, and the driving IC chip is mounted on one substrate. The other method is tape automated bonding (TAB) where a driving IC chip and electrodes on substrates are linked by a flexible printed circuit (FPC) and the driving IC chip is separated from the substrates.

In the case of the latter TAB, the FPC is used to link the substrates and driving IC chip. The density of lines of wiring is restricted because of a problem underlying bonding and manufacturing of the FPC. The compactness in design and the highness in density are therefore limited.

According to the former flip-chip bonding, the driving IC chip is bonded directly onto the electrodes or the wiring electrodes led out from the electrodes using the conductive adhesive. This solves the problem on the density of lines. Thus, a compact design and a high density are realized.

However, a major object of the flip-chip bonding is to realize the compact design and high density. Output pads located at the extreme tips of the wiring electrodes led out from the electrodes are bonded to the output terminals of the driving IC chip. The output pads are therefor packed at a very high density. Consequently, the wiring electrodes extending from pixels to the output pads get very thin and long. This brings about a variation in resistance among the wiring electrodes. An applied voltage therefore varies depending on the resistance. Consequently, there arises a problem that the appearance of a display screen becomes irregular.

The present invention especially attempts to solve the above problem underlying the flip-chip bonding.

DISCLOSURE OF THE INVENTION

An object of the present invention is to overcome irregular display or imperfect display in a screen, which derives from the variation in voltages among wiring electrodes, and to overcome irregular display on the right and left sides of a screen which derives from a potential difference between the right and left sides of a substrate.

According to one aspect of the present invention, there is provided a liquid crystal device having a liquid crystal sandwiched between a pair of substrates that have a plurality of electrodes formed on surfaces thereof which are mutually opposed. A driving IC chip is mounted on at least one of the pair of substrates. The driving IC chip has a plurality of output terminals. At least two of the plurality of output terminals and one of the plurality of electrodes are linked so that a signal will be output from the at least two output terminals to the one electrode.

Moreover, according to another aspect of the present invention, there is provided a liquid crystal device having a liquid crystal sandwiched between a pair of substrates that have a plurality of electrodes formed on surfaces thereof which are opposed mutually. A driving IC chip is mounted on at least one of the pair of substrates. The driving IC chip has a plurality of output terminals. The plurality of output terminals and the plurality of electrodes are linked by wiring electrodes. The wiring electrodes are arranged in such a way that at least two of the plurality of output terminals and one transparent electrode of the plurality of electrodes are electrically coupled with each other.

In this case, the resistances provided by adjoining ones of the wiring electrodes are substantially equal to each other.

Furthermore, according to another aspect of the present invention, there is provided a liquid crystal device having a liquid crystal sandwiched between a pair of substrates that have a plurality of electrodes formed on surfaces thereof which are mutually opposed. A plurality of driving IC chips is mounted on at least one of the pair of substrates. One of the plurality of electrodes and the output terminals of two driving IC chips are electrically coupled to each other.

In this case, the one electrode is shaped like a belt. Two driving IC chips are connected one by one to both ends of the belt-like electrode.

According to the present invention, the liquid crystal sandwiched between the pair of substrates having a plurality of electrodes formed on the surfaces thereof which are mutually opposed is a ferroelectric liquid crystal or antiferroelectric liquid crystal.

Furthermore, according to the present invention, the electrodes may be transparent electrodes or nontransparent metallic electrodes.

BEST MODE FOR CARRYING OUT THE INVENTION

Before an embodiment of the present invention is described, a problem underlying the aforesaid flip-chip boding will be described with reference to the drawings.

Figure 1:
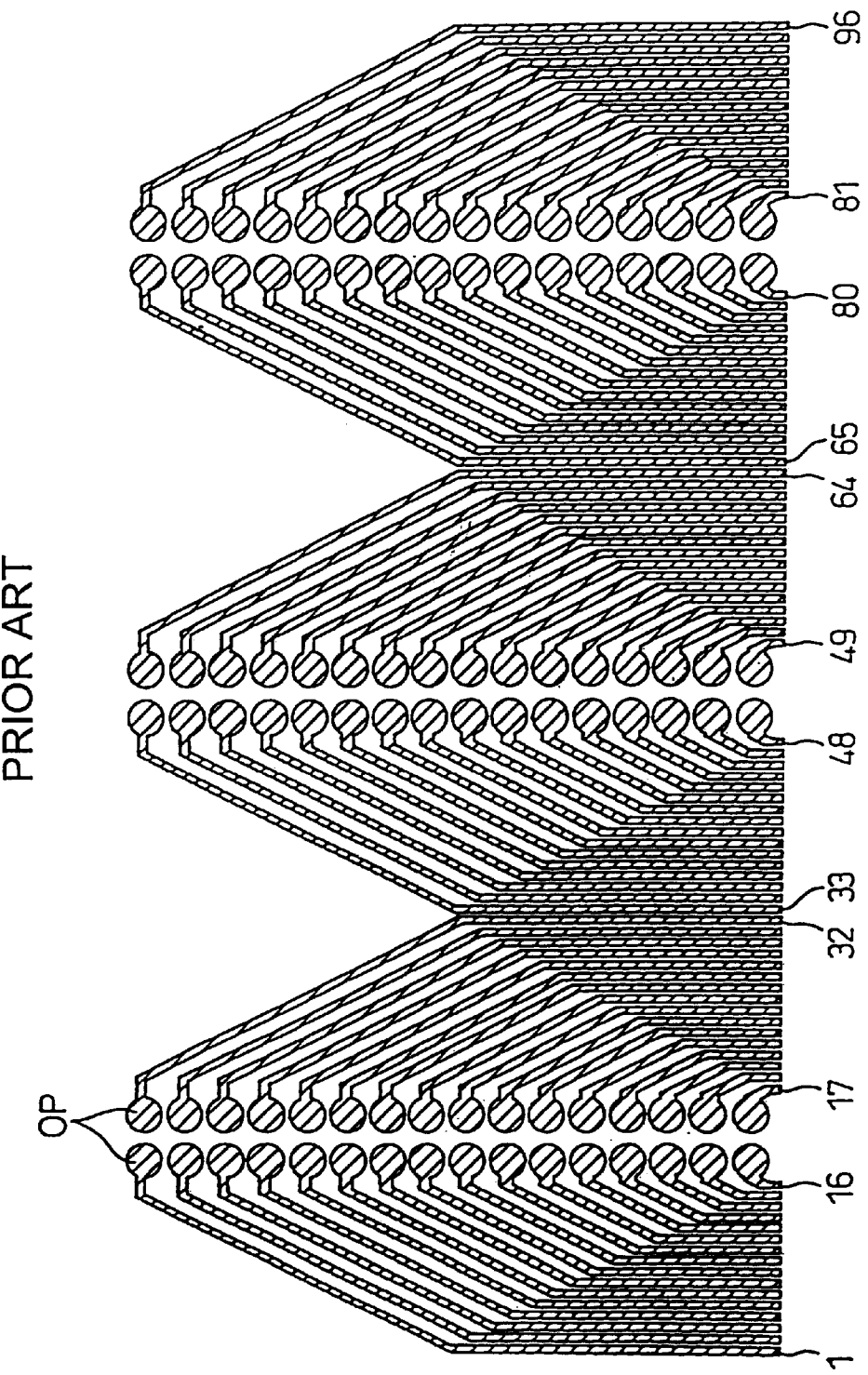
FIG. 1 is a drawing illustratively showing a structure of electrodes in accordance with a prior art.

FIG. 1 is a diagram illustratively showing a structure of electrodes in accordance with a prior art. This drawing is a layout of wiring electrodes where one wiring electrode is routed to each output pad mechanically and experimentally. For example, as illustrated, wiring electrodes (1 to 96) are routed to output pads (round areas at the tips of wiring electrodes: OP).

In this case, the wiring electrodes are designed so that the wiring electrodes 1 to 16 (or 17 to 32, 33 to 48, 49 to 64, 65 to 80, or 81 to 96) will have the same line width and same pitch. The resistance of each wiring electrode is therefore a function of its length. The length of a wiring electrode varies depending on the position of the output pad. The resistances of the wiring electrodes are therefore periodic functions or repetitive large and small values.

The resistances of the wiring electrodes have periodicity. When a potential difference between adjoining output pads is outstandingly large, voltages applied to electrodes associated with the output pads vary from each other. When the liquid crystal device is allowed to execute display, a stripe irregularity stemming from the variation in voltage occurs in each screen.

Figure 2:
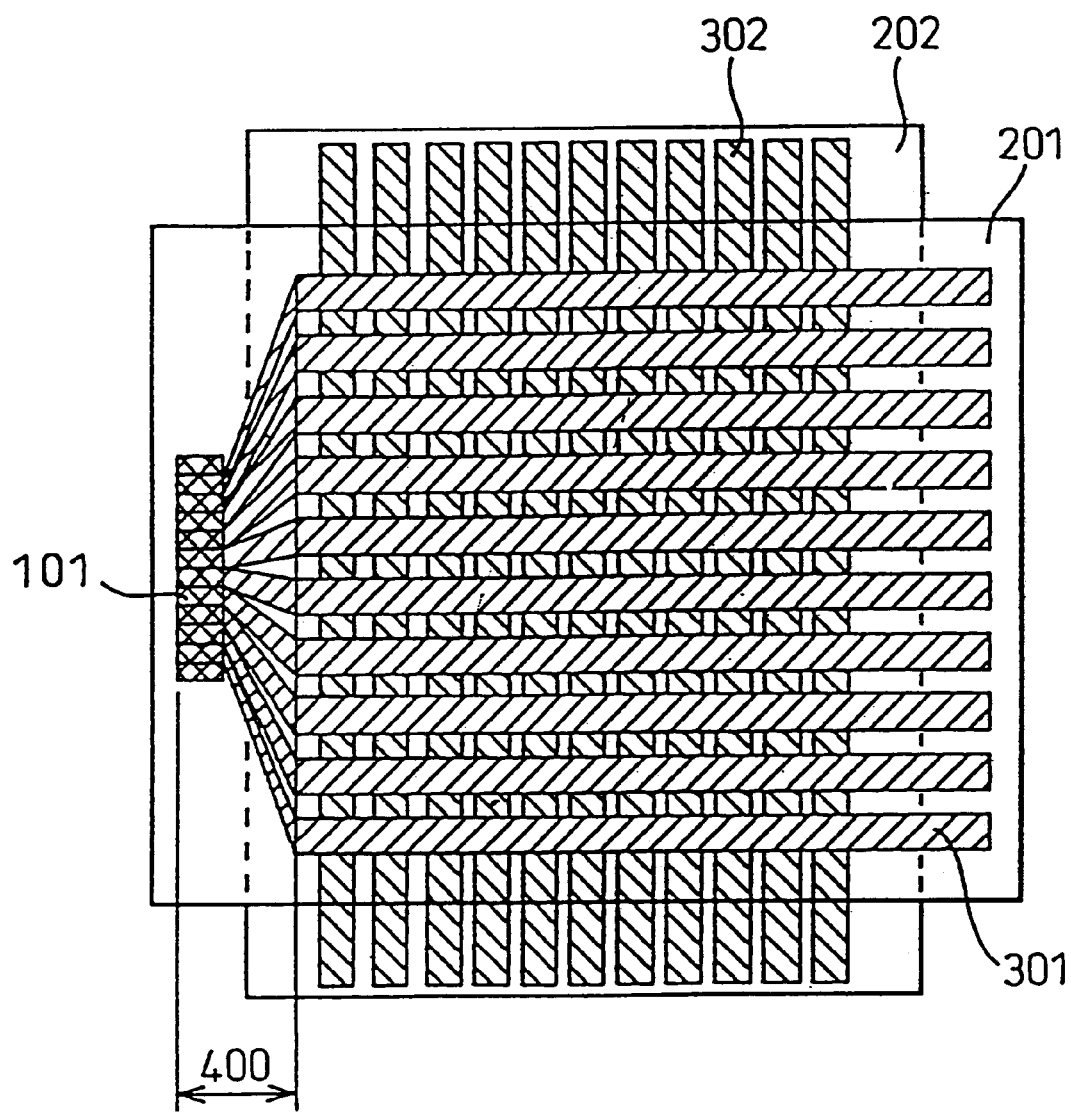
FIG. 2 is a diagram showing the position of a driving IC chip in accordance with the prior art.

FIG. 2 is a diagram showing the position of a driving IC chip in accordance with a prior art. As illustrated, a substrate (201) has electrodes (301) and a substrate (202) has electrodes (302). According to the prior art, a driving IC chip (101) is, as illustrated, mounted on the left side of the substrate. Electrodes located in a space (400) in FIG. 2 are wiring electrodes led out from the electrodes for linking the driving IC chip and the electrodes.

In the foregoing structure, normally, connected to one substrate is, as illustrated, one driving IC chip (101) on the left side of the drawing. However, when a larger display screen is adopted, that is, when the electrodes get longer, a voltage drop deriving from the large length of the electrodes occurs on the opposite side of the substrate relative to the driving IC chip-mounted side. Consequently, a voltage applied to the right side of the liquid crystal device opposite to the left side thereof becomes lower than the one applied to the left side of the liquid crystal device near the driving IC chip. This poses a problem that the right side of a screen gets darker.

In particular, a liquid crystal device using a ferroelectric liquid crystal or an anti-ferroelectric liquid crystal, which responds sensitively to a voltage change, has a problem that irregular display or imperfect display deriving from a voltage drop becomes quite discernible.

According to the foregoing conventional method of linking a driving IC chip and electrodes according to the flip-chip bounding, the output pads at the extreme tips of the wiring electrodes led out from the electrodes are packed at a very high density. In particular, the wiring electrodes extending from pixels to the output pads are very thin and long. The resistances of the wiring electrodes are therefore functions of the lengths of the wiring electrodes. The resistance of a wiring electrode is therefore estimated as a periodic function of a value dependent on the position of an output pad. Due to the periodicity of resistances, voltages applied to the electrodes vary from one another. This causes stripe irregularities to appear in a display screen.

In particular, a liquid crystal device using a ferroelectric liquid crystal or anti-ferroelectric liquid crystal is, unlike a liquid crystal device using an STN liquid crystal or TN liquid crystal, sensitive to a slight change in voltage. The irregular display or imperfect display becomes more outstanding, posing a problem.

For coping with the problem, the line width of wiring electrodes is made as large as possible. This was expected to resolve the variation in voltage value deriving from a difference in resistance. However, as described previously, the output pads and wiring electrodes are packed at a high density. When one output terminal of a driving IC chip and one electrode are linked, there are limitations in increasing the line width of wiring electrodes.

An object of the present invention is to effectively eliminate the variation in resistance among wiring electrodes linked to a driving IC chip so as to thus overcome irregular display or imperfect display deriving from the variation in voltage, and to resolve a difference in resistance between the right and left sides of a substrate.

The present invention provides a fundamental structure described below to accomplish the above object. Specifically, a liquid crystal display has a liquid crystal sandwiched between a pair of substrates that have a plurality of electrodes formed on surfaces thereof which are mutually opposed. On one substrate, a driving IC chip is mounted. The driving IC chip has a plurality of output terminals. The output terminals and electrodes are linked so that a signal will be output from at least two of the output terminals to one electrode.

Moreover, the output terminals and electrodes are linked by wiring electrodes led out from the electrodes. The wiring electrodes are arranged so that at least two output terminals and one electrode are electrically coupled with each other. The resistances of the wiring electrodes are nearly equalized to each other.

Furthermore, a plurality of driving IC chips are mounted on a substrate. One electrode and two driving IC chips are electrically coupled with each other. The electrodes are each shaped like a belt. Two driving IC chips are connected one by one to both ends of the belt-shaped electrodes.

Furthermore, the electrodes may be transparent electrodes or non-transparent metallic electrodes.

In the foregoing structure, when the liquid crystal sandwiched between the substrates is a ferroelectric liquid crystal or anti-ferroelectric liquid crystal, the present invention will exert a greater effect.

An embodiment of the present invention will be explained in detail in conjunction with the drawings.

Figure 3:
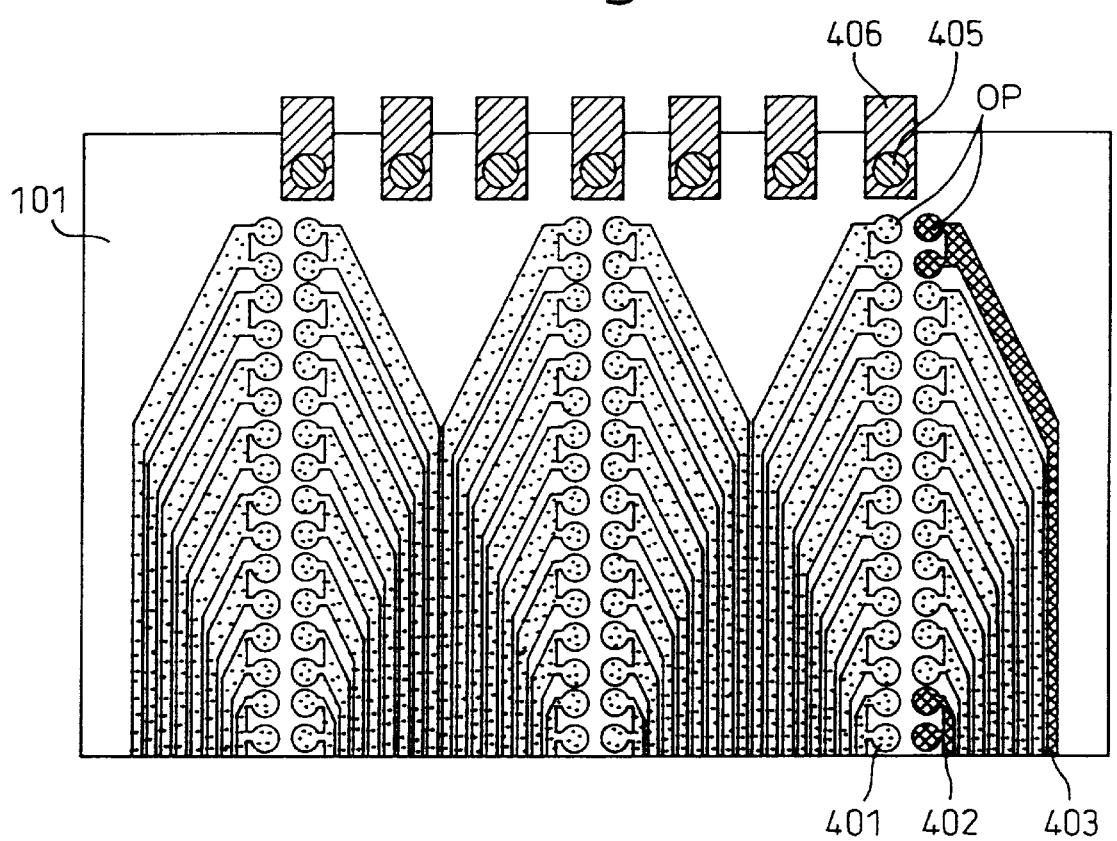
FIG. 3 is a diagram illustratively showing a structure of electrodes in accordance with the present invention.

FIG. 3 is a diagram illustratively showing a structure of electrodes in accordance with the present invention. According to the present invention, as illustrated, two wiring electrodes are united into one wiring electrode (See wiring electrodes 402 and 403). A new width of a wiring electrode is thus innovated. Specifically, the same signal is output from two output terminals of a driving IC chip, and the wiring electrodes are arranged in such a way that two output pads and one wiring electrode are linked. Consequently, two output pads share the same one wiring electrode. The wiring electrodes have a line width that is twice or more as large as the width of the wiring electrode in accordance with the prior art. The variation in resistance among the wiring electrodes can be minimized.

However, even when the line width of wiring electrodes is increased to be twice or more as large as the one in accordance with the prior art, the periodicity of resistances deriving from the lengths of the wiring electrodes cannot be resolved completely. Slight periodicity remains. This is attributable to the fact that the area of a wiring electrode varies depending on the position of an output pad. The present inventor has devised a method of correcting the area of each wiring electrode to equalize resistances of wiring electrodes and those of output pads.

A description will be made by taking the output pads and wiring electrodes shown in FIG. 3 as examples. For example, a wiring electrode (402) linking an electrode and an output pad located near the electrode is made thinner than a wiring electrode (403) linking the electrode and an output pad located far from the electrode. When the areas of wiring electrodes are thus corrected, the resistances of the wiring electrodes can be equalized to one another. Eventually, the periodicity of resistances can be resolved.

Using the above method, twice as large a number of output terminals as the number of output terminals employed in accordance with the prior art is necessary to generate an output signal of the same level. In reality, a double number of driving IC chips is necessary. As long as a substrate has a space in which the double number of driving IC chips can be mounted, no problem will occur. Moreover, since the same signal is output from two output terminals, the load imposed on a driving IC chip can be alleviated. This may be effective in reducing noises in an output signal.

Incidentally, FIG. 3 is an enlarged view of the extreme tips of wiring electrodes on the back of the driving IC chip (101) shown in FIG. 2. However, this drawing shows the extreme tips illustratively. The total number of electrodes shown in FIG. 3 is inconsistent with that shown in FIG. 2.

The driving IC chip (101) shown in FIG. 3 is a driving IC chip used exclusively to output an image signal to a liquid crystal panel. Round electrodes located at the extreme tips of the wiring electrodes are the output pads (OP, 401). Two columns of sixteen output pads (16×2=32) constitute one block. Ten blocks (32×10=320 output pads) are lined up sideways. FIG. 3 is an enlarged view showing only three blocks. The electrodes led out from the output pads (OP, 401) are the wiring electrodes (402, 403). In the drawing, reference numeral 405 denotes an input pad, and reference numeral 406 denotes an input electrode.

Moreover, in relation to the aforesaid prior art, imperfect display where an amount of transmitted light differs between the right margin and left margin of a display screen has been described. This is because when belt-shaped electrodes get longer due to enlargement of a display screen, a voltage drop stemming from a difference in resistance between one side of the electrodes near a driving IC chip and the opposite side thereof occurs. For example, when the driving IC chip (101) is, as shown in FIG. 2, located on the left side of a screen, a voltage applied to the right side of the screen gets lower than that applied to the left side thereof. This poses a problem that the right side of the screen gets darker. In an effort to solve this problem, the present invention provides a structure shown in FIG. 4.

Figure 4:
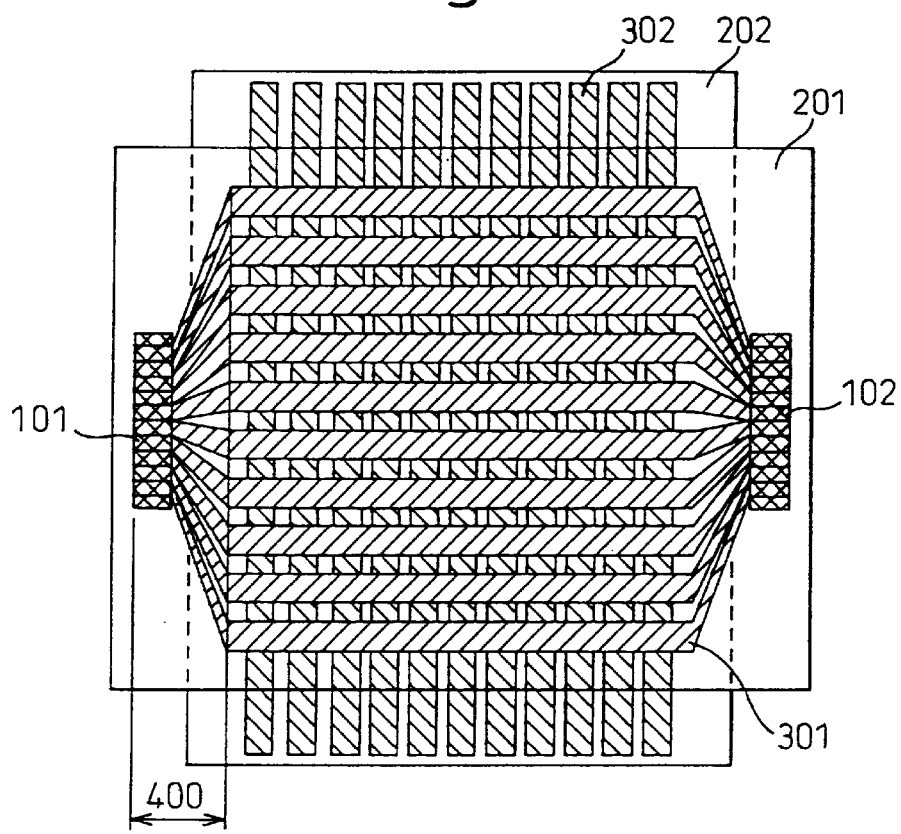
FIG. 4 is a diagram showing a layout of driving IC chips in accordance with the present invention.

FIG. 4 is a diagram showing a layout of driving IC chips in accordance with the present invention. For preventing a voltage drop from occurring on a side of a screen opposite to the left side thereof on which the driving IC chip (101) is located, a driving IC chip (102) is placed at the left end of the belt-shaped electrodes. In other words, the driving IC chips are arranged so that the two driving IC chips can output the same signal to one electrode. Owing to this structure, an electrode controlled by one driving IC chip has a length that is approximately a half of the length of an electrode controlled according to the prior art. Consequently, a difference in voltage between the right and left sides of a display screen will not occur.

Needless to say, even when driving IC chips are connected to both sides of one electrode, two output terminals of each driving IC chip and one electrode may be linked by a wiring electrode, and the resistance of the wiring electrode may be corrected. This would result in a greater effect.

The resistance of a wiring electrode occurring in the above structure will be described. As illustrated, two driving IC chips (101, 102) are located at both ends of electrodes on a substrate (201). For simplification, a difference in resistance within a zone in a screen will be discussed.

In a rectangular belt-shaped zone like an electrode, the resistance of the electrode is, as already known, directly proportional to the length thereof and inversely proportional to the width thereof. Where the width of one electrode is the same, a wider screen is prone to a higher resistance. Moreover, as far as the width of a screen zone is the same, a larger number of electrodes (higher density) leads to a higher resistance.

For example, when the line width of an electrode is 100 $\mu$m and the length thereof is 10 cm, the resistance at a position on the electrode 10 cm away from an end of the electrode near a driving IC chip is double the resistance at a position thereon 5 cm away therefrom. A greater voltage drop therefore occurs at the position on the electrode 10 cm away from the end of the electrode. In reality, electric fields are applied to a substrate via a liquid crystal layer. The liquid crystal between a pair of substrates works as a capacitor. It will therefore not take place that a voltage applied to the electrode is simply halved at the position on the electrode 10 cm away from the end of the electrode. However, when a display is actually viewed, the contrast of the display may be discerned differently between one side of a display screen near the driving IC chip and the opposite side thereof, though it depends on a liquid crystal material. In particular, when a ferroelectric liquid crystal or anti-ferroelectric liquid crystal, which is susceptible to a voltage drop, is used, the imperfect display occurs outstandingly.

In this case, as mentioned above, a driving IC chip is connected to the other ends of electrodes. When a voltage is applied to an electrode, the length of the farthest position on the electrode to which the voltage is applied from one driving IC chip becomes a half. Consequently, a voltage drop can be halved. In FIG. 4, the driving IC chips are placed by both sides of the electrodes on the substrate 201 alone. Needless to say, driving IC chips may be placed by both sides of the electrodes on the other substrate (202).

Figure 5:
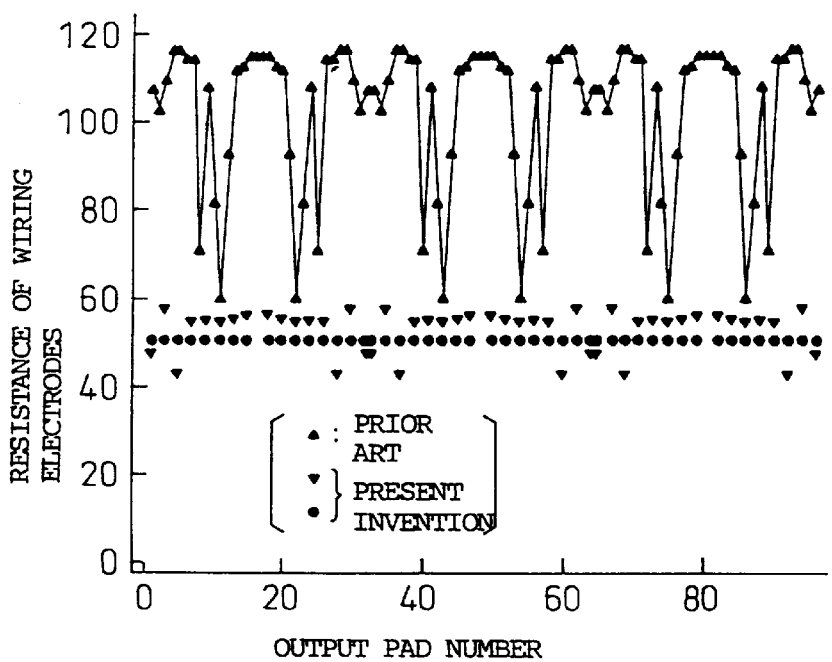
FIG. 5 is a graph indicating an effect of resistances of wiring electrodes exerted by the present invention.

FIG. 5 is a graph indicating an effect of resistances of wiring electrodes exerted by the present invention. This graph indicates resistances of wiring electrodes in relation to positions of output pads. The axis of abscissas indicates the output pad numbers joined with output terminals of a driving IC chip, and the axis of ordinates indicates the resistances of wiring electrodes in ohm. Marks ▲ on a solid line indicate resistances at the output pads which result from the conventional arrangement of wiring electrodes shown in FIG. 2. As illustrated, the resistances have periodicity because every seventeenth output pad exhibits a high resistance. Apparently, the resistances greatly vary from one another.

By contrast, resistances indicated with marks ▼ are measured when two wiring electrodes led out from adjoining output pads are bundled into one wiring electrode, or result from the arrangement of wiring electrodes shown in FIG. 3. The area of a wiring electrode allocated to one output is thus nearly doubled. This alone causes the resistance of a wiring electrode to become approximately a half. A difference in resistance between adjoining wiring electrodes is minimized. However, as illustrated, the resistances vary a little, that is, have periodicity. In this state, the periodicity may lead to irregular display.

The present invention attempts to prevent the levels of adjoining signals from differing from each other greatly. Specifically, the resistances marked with ▼ are integrated, and an optimal resistance for one output is calculated using the result of integration. The area of each wiring electrode is determined so that the resistance thereof will approach to the optimal resistance. The resultant resistances are indicated with marks ● in FIG. 5. As apparent from the graph, the periodicity of resistances that appears in units of a block of output pads, and a difference in resistance between adjoining outputs are hardly observed.

As described so far, according to the present invention, compared with the prior art, the line width of a wiring electrode can be made twice larger or more. A variation in resistance among wiring electrodes is resolved. Moreover, the areas of wiring electrodes are corrected so that the resistances of the wiring electrodes will be equal to those at output pads from which the wiring electrodes are led out. Consequently, the periodicity of the resistances can be resolved. Eventually, irregular display deriving from these causes can be overcome.

Furthermore, a response speed to be permitted by output pads of a driving IC chip is doubled when two outputs are integrated into one. The response speed is tripled when three outputs are integrated into one. This results in a pure driving wave causing no error and containing little noise.

Furthermore, when driving IC chips are placed at both ends of belt-shaped electrodes, a difference in voltage between the right and left sides of a display screen will not occur. Consequently, a difference in display state between the right and left sides of the display screen will be resolved.

INDUSTRIAL APPLICABILITY

As described previously, according to the flip-chip bounding, a compact design and a high density are realized by bonding a driving IC chip directly to electrodes. Even when the bonding method is adopted, output pads at the extreme tips of wiring electrodes led out from the electrodes are bonded to output terminals of the driving IC chip. The output pads are therefore packed at a very high density. This poses a problem that a wiring electrode linking pixels and an output pad gets very thin and long. The present invention resolves a variation in resistance among wiring electrodes which underlies the flip-chip bonding and overcomes irregular display in a screen. The applicability of the present invention to a display device employing a liquid crystal device is very high and the industrial value of the present invention is very high.

What is claimed is:

1. In a structure of electrodes for a liquid crystal device having a liquid crystal sandwiched between a pair of substrates that have a plurality of electrodes formed on mutually opposed surfaces of the substrates, the improvement comprising:

a driving IC chip mounted on at least one of said pair of substrates;

said driving IC chip having a plurality of output terminals; and at least two of said plurality of output terminals and one of said plurality of electrodes being linked so that a signal will be output from the at least two output terminals to the one electrode.

2. In a structure of electrodes for a liquid crystal device having a liquid crystal sandwiched between a pair of substrates that have a plurality of electrodes formed on mutually opposed surfaces, the improvement comprising:

a driving IC chip mounted on at least one of said pair of substrates;

said driving IC chip having a plurality of output terminals;

said plurality of output terminals and said plurality of electrodes being linked by wiring electrodes; and said wiring electrodes being arranged so that at least two of said plurality of output terminals and one of said plurality of electrodes will be electrically coupled with each other.

3. A structure of electrodes for a liquid crystal device according to claim 2, wherein resistances of adjoining ones of said wiring electrodes are substantially equal to each other.

4. A structure of electrodes for a liquid crystal device according to any of claims 1 to 3, wherein said liquid crystal sandwiched between said pair of substrates that have said plurality of electrodes formed on said mutually opposed surfaces thereof is a ferroelectric liquid crystal.

5. A structure of electrodes for a liquid crystal device according to any of claims 1 to 3, wherein said liquid crystal sandwiched between said pair of substrates that have said plurality of electrodes formed on said mutually opposed surfaces thereof is an anti-ferroelectric liquid crystal.

6. A structure of electrodes for a liquid crystal device according to any of claims 1 to 3, wherein said electrodes are transparent electrodes.

7. A structure of electrodes for a liquid crystal device according to any of claims 1 to 3, wherein said electrodes are non-transparent metallic electrodes.

* * * * *